(12) United States Patent
Zhang

(10) Patent No.: US 10,692,183 B2
(45) Date of Patent: Jun. 23, 2020

(54) CUSTOMIZABLE IMAGE CROPPING USING BODY KEY POINTS

(71) Applicant: ADOBE INC., San Jose, CA (US)

(72) Inventor: Jianming Zhang, Campbell, CA (US)

(73) Assignee: ADOBE INC., San Jose, CA (US)

( * ) Notice: Subject to any disclaimer, the term of this patent is extended or adjusted under 35 U.S.C. 154(b) by 261 days.

(21) Appl. No.: 15/940,452

(22) Filed: Mar. 29, 2018

(65) Prior Publication Data

US 2019/0304064 A1 Oct. 3, 2019

(51) Int. Cl.
*G06T 3/60* (2006.01)
*G06T 3/40* (2006.01)
*G06K 9/32* (2006.01)
*G06K 9/00* (2006.01)

(52) U.S. Cl.
CPC ........ *G06T 3/4046* (2013.01); *G06K 9/00369* (2013.01); *G06K 9/3241* (2013.01); *G06T 2207/20081* (2013.01)

(58) Field of Classification Search
CPC .. G06K 9/00362–00369; G06K 9/3233–3241; G06T 3/4046; G06T 2207/20132; G06T 2207/20081
See application file for complete search history.

(56) References Cited

U.S. PATENT DOCUMENTS

| 8,903,138 | B1 * | 12/2014 | Steffens | G06K 9/00228 382/118 |
|---|---|---|---|---|
| 10,083,521 | B1 * | 9/2018 | Dhua | G06K 9/4652 |
| 10,296,102 | B1 * | 5/2019 | Misra | G06K 9/2054 |
| 10,470,510 | B1 * | 11/2019 | Koh | A41H 1/02 |
| 2010/0091330 | A1 * | 4/2010 | Marchesotti | G06K 9/3233 358/1.18 |
| 2015/0043788 | A1 * | 2/2015 | Lee | G06K 9/00362 382/110 |
| 2015/0117784 | A1 * | 4/2015 | Lin | G06K 9/4671 382/195 |

(Continued)

OTHER PUBLICATIONS

Cao, Z., Simon, T., Wei, S. E., & Sheikh, Y. (2017). Realtime multi-person 2d pose estimation using part affinity fields. In Proceedings of the IEEE Conference on Computer Vision and Pattern Recognition (pp. 7291-7299).

*Primary Examiner* — Sean T Motsinger
(74) *Attorney, Agent, or Firm* — Shook, Hardy & Bacon L.L.P

(57) ABSTRACT

Systems, methods and computer storage media for using body key points in received images and cropping rule representations to crop images are provided. Cropping configurations are received that specify characteristics of cropped images. Also obtained are images to crop. For a given image, a plurality of body key points is determined. A list of tuples is determined from the body key points and the cropping configurations. Each tuple includes a reference point, a reference length and an offset scale. A possible anchor level is calculated for each tuple. Each tuple sharing a common reference body key point is aggregated and a border representation is determined by calculating the minimum, maximum or average of all such possible anchor levels. The image is then cropped at the border representation. This process can be repeated for multiple border representations within a single image and/or for multiple images.

20 Claims, 4 Drawing Sheets

(56) References Cited

U.S. PATENT DOCUMENTS

| | | | |
|---|---|---|---|
| 2015/0213612 A1* | 7/2015 | Lin | G06F 16/5838 |
| | | | 382/173 |
| 2016/0104055 A1* | 4/2016 | Lin | G06T 3/0012 |
| | | | 382/298 |
| 2016/0127641 A1* | 5/2016 | Gove | G06T 1/00 |
| | | | 348/143 |
| 2017/0169314 A1* | 6/2017 | Dijkman | G06K 9/4628 |
| 2017/0301063 A1* | 10/2017 | Merhav | G06T 3/4046 |
| 2017/0371898 A1* | 12/2017 | Sharma | G06F 3/04842 |
| 2018/0174299 A1* | 6/2018 | Agrawal | G06T 7/90 |
| 2018/0189949 A1* | 7/2018 | Lapiere | G06T 7/0014 |
| 2019/0080046 A1* | 3/2019 | Apte | G16H 50/30 |
| 2019/0108640 A1* | 4/2019 | Zhang | G06N 3/0454 |
| 2019/0156106 A1* | 5/2019 | Schroff | G06K 9/00228 |
| 2019/0159844 A1* | 5/2019 | Daniels | G06T 7/33 |
| 2019/0286649 A1* | 9/2019 | Sharma | G06F 3/04883 |
| 2019/0304064 A1* | 10/2019 | Zhang | G06T 11/60 |
| 2019/0340470 A1* | 11/2019 | Hsieh | G06N 3/04 |
| 2019/0357615 A1* | 11/2019 | Koh | G06K 9/00369 |
| 2019/0370546 A1* | 12/2019 | Agarwal | G06K 9/00671 |

\* cited by examiner

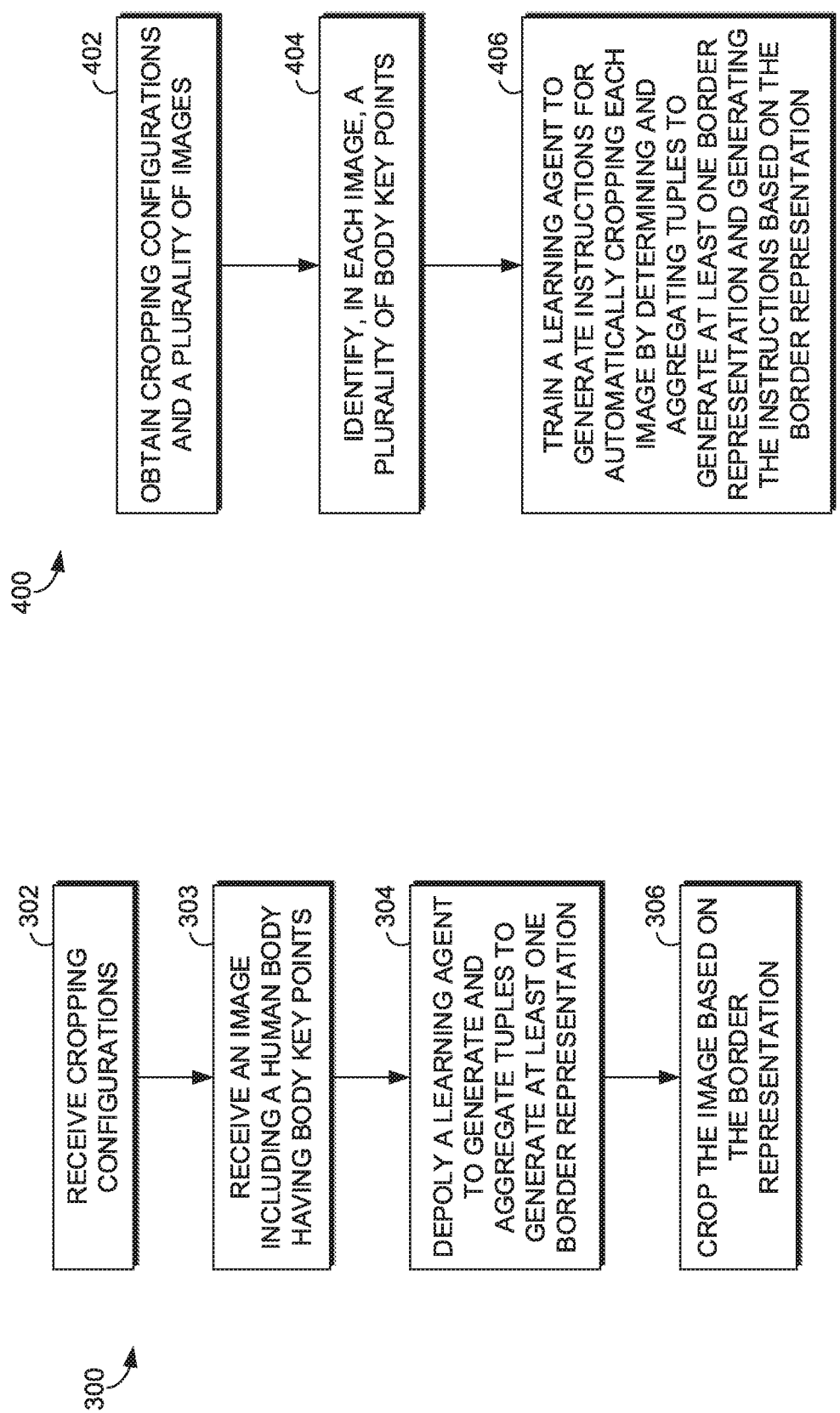

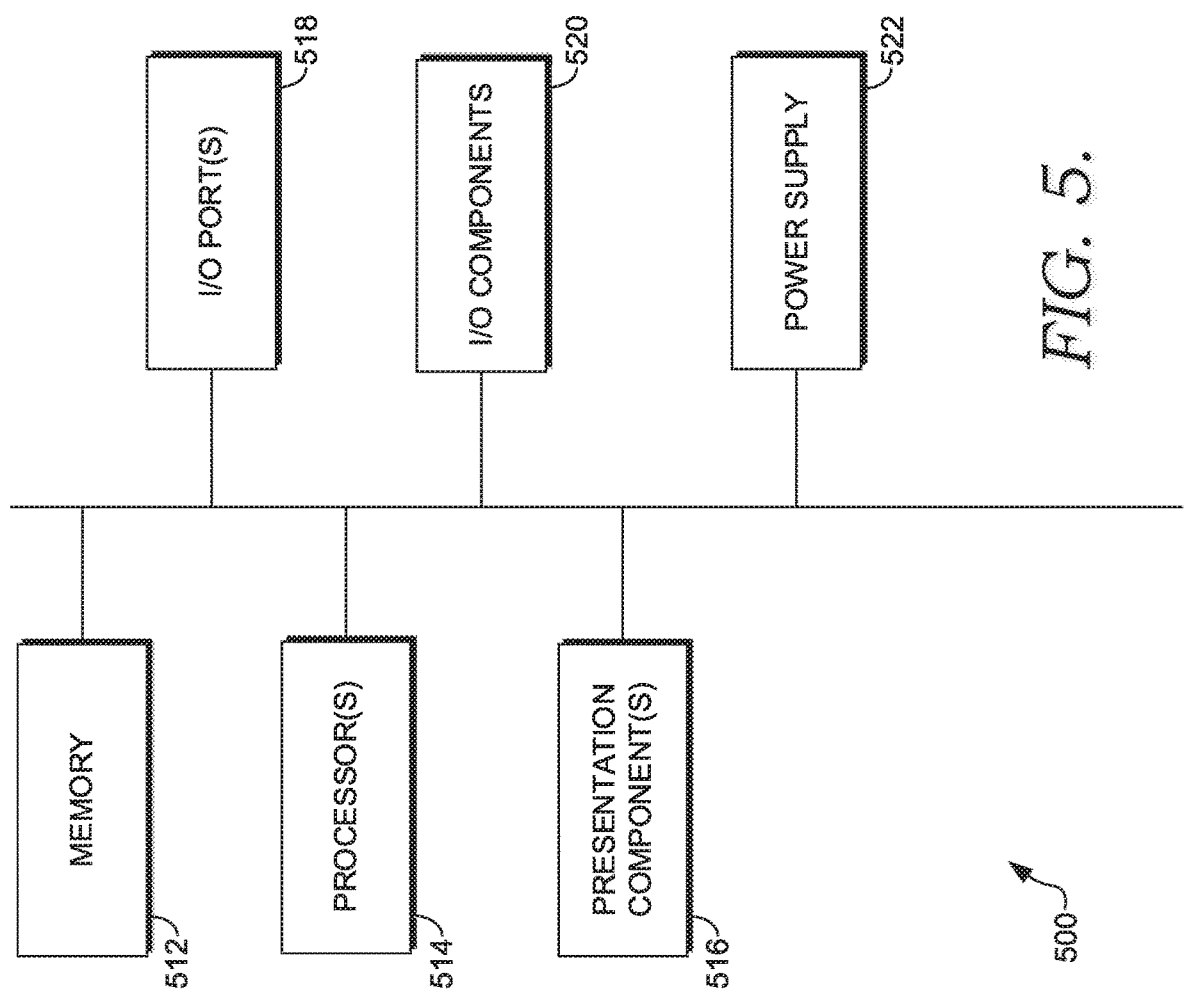

CUSTOMIZABLE IMAGE CROPPING USING BODY KEY POINTS

BACKGROUND

Image Cropping has become a fundamental problem that has gained utmost importance in the modern era of online retailing. Generally, online retailers have a large number of images which require manual cropping in order to comply with guidelines comprised of certain standards, as well as the needs of particular retailers. For images containing human subjects, the guidelines can include a variety of different positions and angles at which a set of images is to be cropped. The guidelines can be affected by balancing such considerations as consistency, creativity, and cost-effectiveness. For example, image cropping guidelines may require images containing human subjects to be cropped exactly beneath the subject's nose to decrease the cost associated with paying models for publishing their face shots, or right beneath the knees to accentuate the positioning of the product being showcased.

Currently, online retailers specify certain image cropping rules to define how images showcasing their products are to be cropped. For images containing human subjects, such cropping rules may include, e.g., a prefixed aspect ratio, the position of a model, and/or the location of the cropped image borders relative to keys points on a human subject's body. However, the current methods require human experts to manually apply these rules to individual images. This process can hence be extremely time consuming and costly. It also can lead to errors in consistency of the cropping; affecting the quality of the cropped images.

SUMMARY

Embodiments of the present invention relate to using human body key points identified in received images and cropping rule representations to automate the cropping of images. A set of user-defined cropping configurations is received, the cropping configurations specifying characteristics of resultant cropped images desired by the user. Also received are one or more images that the user desires to have cropped in accordance with the set of cropping configurations, each image including at least a portion of human body. For a given image, a plurality of body key points (i.e., points on the human body included in the image that can be utilized as references in determining a cropping location and position) is identified. In aspects, the body key points can be identified utilizing a neural network detection model. A list of tuples is determined from the identified body key points and the set of cropping configurations. Each tuple consists of a reference point (i.e., a human body key point used as a reference), a reference length (i.e., a distance between two body key points) and a scale, the value of which is determined based on the reference length, in order to determine any offset for positioning a border representation (i.e., a border location for cropping an image) with respect to the reference point. The tuples comprising each portion of the list of tuples that share a reference point are aggregated with one another to provide a robust border representation relative to the human body key points. That is, a possible anchor level is calculated for each tuple of a set of tuples that share a reference point and a border representation is obtained by calculating the minimum, maximum or average of all possible anchor levels of the set of tuples. The image is then cropped at the border representation. This process can be repeated for multiple border representations within a single image and/or for a plurality of images. The technology automates the cropping of images allowing for improved cropping consistency.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 3 is a flow diagram showing a method for cropping an image using body key points, in accordance with some implementations of the present disclosure;

FIG. 4 is a flow diagram showing a method for cropping multiple images using body key points, in accordance with some implementations of the present disclosure; and FIG. 5 is a block diagram of an exemplary computing environment suitable for use in some implementations of the present disclosure.

DETAILED DESCRIPTION

Figure 1:
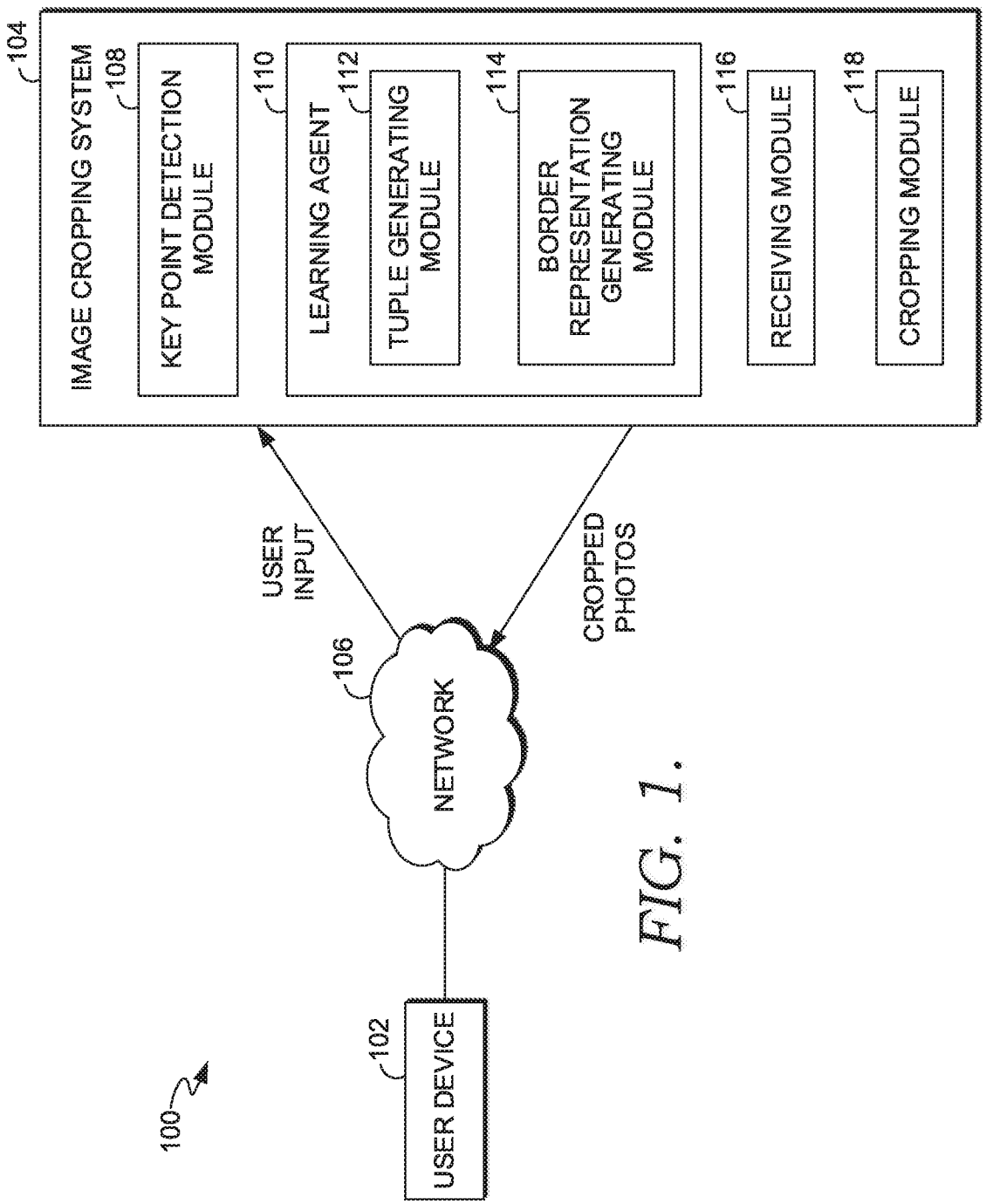
FIG. 1 is a block diagram illustrating an exemplary system in accordance with some implementations of the present disclosure.

The subject matter of the present invention is described with specificity herein to meet statutory requirements. However, the description itself is not intended to limit the scope of this patent. Rather, the inventor has contemplated that the claimed subject matter also might be embodied in other ways, to include different steps or combinations of steps similar to the ones described in this document, in conjunction with other present and/or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied when one or more features are present. Also, the term "or" includes the conjunctive, the disjunctive and both (a or b thus includes either a or b, as well as a and b).

Various terms are used throughout this description, Definitions of some terms are included below to provide a clearer understanding of the ideas disclosed herein:

As used herein, the term "cropping configuration" refers to a set of guidelines, generally provided by a user (such as an online retailer) for cropping one or more images. That is, cropping configurations are user-defined conditions that specify, for instance, the shape, size and/or position of a desired image cropping border. In aspects, useful cropping configurations can differ based on various characteristics of a resultant cropped image requested by the user. For example, useful configurations for a cropped image having a rectangular shape can include a crop aspect ratio, upper and lower body positions, and a body center position. For a cropped image having a circular shape, on the other hand, useful configurations can include a body center position and a cropped image radius. As more fully described below, cropping instructions can be defined using different cropping configurations or sets of cropping configurations based on user requirements and/or preferences.

The term "body key point," as used herein, refers to a point or feature associated with a human body included in an image, reference to which can be useful in determining a position at which to crop the image. A human body shown in an image can be comprised of a plurality of points or features which may be utilized as body key points, including, without limitation, the left eye, the right eye, the left ear, the right ear, the nose, the neck, the left shoulder, the right shoulder, the left elbow, the right elbow, the left wrist, the right wrist, the left hip, the right hip, the left knee, the right knee, the left ankle, and the right ankle. In accordance with implementations of the present disclosure, and as described in further detail below, at least two body key points generally are utilized to determine a position (i.e., a border representation) at which to crop an image.

The term "reference point" or "reference body key point," as used herein, refers to a specific body key point to be used as a reference in defining a particular cropping location (i.e., cropping border representation).

The term "tuple" refers to a set of values that define a possible position at which to crop an image based on body key points and cropping configurations. As more fully described below, each tuple consists of a reference point, a reference length (i.e., a distance between two body key points) and a scale, the value of which is determined based on the reference length, in order to determine any offset for positioning a border representation with respect to the reference point. Collectively, a set of tuples sharing a reference point can be utilized to determine an appropriate anchor level for each position at which an image is to be cropped (that is, each border representation).

The term "anchor level," as used herein, defines the position of a border representation determined with respect to a reference body key point. As more fully described below, each tuple provides a possible position for an anchor level (i.e., a possible anchor level) as a function of the position of the reference point, the scale and the distance between two body key points (reference length). Each border representation is determined by aggregating one or more possible anchor levels. The possible anchor levels (representing the possible border representations) are aggregated by calculating a maximum, minimum or average of all possible anchor levels for tuples having a common reference point to define a border representation. If a border representation is set to be a minimum of the possible anchor levels, the possible anchor level closest to a bottom of the image is used. If a border representation is set to be an average of the possible anchor levels, the average position of all possible anchor levels is used. If a border representation is to be set to be a maximum of the possible anchor levels, the possible anchor level closest to the top of the image is used.

The term "scale," as used herein, defines a cropping offset relative to a given body key point. For instance, a cropping configuration may specify that an image is to be cropped beneath the nose of the human body included in an image. Because the cropping configuration specifies "beneath," the scale is negative. The value of the scale is the distance below the nose at which the image is to be cropped. The appropriate distance is calculated based on the reference body key point (i.e., the nose in this example) and the reference length between the nose and another body key point. Thus, if an image is a close-up image, the value is calculated to be larger than if the image is taken from a greater distance away from the human subject.

The term "border representation," as used herein, refers to a position of a border at which an image is to be cropped defined by aggregating the possible anchor levels of the tuples associated with a given reference body key point. The aggregation is defined by a minimum, maximum or average of all anchor levels. As more fully discussed below, each border representation determines a position at which an image is to be cropped. Depending on, for instance, the size, shape and/or configuration at which an image is to be cropped, a set of one or more border representations together positions the entirety of the cropping rule representation. By way of example, cropping configurations specifying a resultant rectangular-shaped cropped image may require one or both of an upper border representation and a lower border representation to define the cropping rule representation, may require only an upper border representation or a lower border representation, may require one or both of a left border representation and a lower border representation, may require only a left border representation or a right border representation, or may require upper, lower, left and right border representations.

The term "cropping rule representation," as used herein, refers to a set of one or more border representations that collectively define the entirety of the instructions to be used in cropping one or more images.

Neural network models are often used as models for detecting human body key points in an image. Traditionally, the human body key points are used to detect the number and positions of human bodies in an image. One common approach is to use Part Affinity Fields to train a model to associate body parts with individual human bodies in an image. It uses a set of two-dimensional vector fields that encode the location and orientation of limbs over an image. Some models use top-down parts detection approaches that use, for example, k-poselets, stacked hourglass networks, convolutional networks, deep neural networks, multi-source deep learning, convolutional part heatmap regression, etc. Other models use bottom-up parts detection approaches that use, for example, ResNet, image-dependent pairwise scores, etc. To the inventor's knowledge, prior to the present invention, these human body key point models have not been used used beyond their stated purpose of finding the number of human bodies and their individual parts in an image.

Embodiments of the present invention address the technical problem of using key points associated with human bodies included in images to crop one or more images. A robust learning agent can be used to leverage the human body key points to determine borders at which to crop images based on certain cropping configurations. A user (for instance, an online retailer) can define these cropping configurations for cropping a set of one or more images. In embodiments hereof, for each image, a set of human body key points may be detected using one or more neural network models. These detected key points then may be used as reference points for cropping one or more images in accordance with the user-defined cropping configurations.

The key points may be used in conjunction with the user-defined cropping configurations to define a cropping rule representation comprised of one or more border representations for each image. As will be described in further detail below, implementations of the technology described herein employ a cropping rule representation for specifying cropping borders. The cropping configurations can be defined by users in different ways to result in cropped images having various characteristics. For example, for cropped images having a rectangular shape, cropping configurations may be described using a crop aspect ratio, upper/lower body positions and/or left/right body positions, and a body center position. For cropped images having a circular shape, cropping configurations may be described using a radius and a body center position. As will be discussed in further detail below, one or more border rule representations may be determined, each border rule representation being based on a list of tuples, each tuple including a reference body key point, a reference length and a scale. The tuples then may be aggregated to provide a robust border rule representation relative to the human body key points included in the image. The image then may be automatically cropped based on one or more border rule representations collectively comprising a cropping rule representation. The same process may be repeated for each image in a set.

Aspects of the technology disclosed herein provide a number of advantages over previous cropping methods. For instance, this technology produces consistent cropping results for a set of images based on a user's specification. Previous approaches required a human expert to manually crop each image in a set, even when each image was to be cropped to the exact same configuration. Such manual cropping leads to inconsistent results due, in part, to human error. The technology disclosed herein produces consistently cropped images even over a large set. Additionally, the previous approach is time consuming and costly as it requires a lot of human time to crop images, especially when cropping of a large set of images is desired.

Accordingly, an exemplary aspect of the invention is directed to one or more computer storage media storing computer-useable instructions that, when used by one or more computing devices, cause the one or more computing devices to perform operations. The operations include receiving a set of cropping configurations and an image. The image includes at least a portion of a human body having a plurality of body key points associated therewith. The operations further include deploying a learning agent of an image cropping system to determine, utilizing a tuple generating module implemented by a processor, a list of tuples based on the set of cropping configurations and at least a portion of the plurality of body key points. Each tuple includes a reference body key point of the plurality of body key points, a reference length defined by a distance between two of the plurality of body key points, and a scale. The learning agent is further deployed to aggregate, utilizing a border representation generating module implemented by the processor, the list of tuples to generate at least one border representation. The operations further include utilizing a cropping module implemented by the processor, to automatically crop the image based at least in part on the border representation.

Another exemplary aspect of the invention is directed to a computer-implemented method of training a learning agent of an image cropping system to crop images. The method includes obtaining, by the image cropping system, a set of image cropping configurations and a plurality of images, each image of the plurality of images including at least a portion of a human body. The method further includes, utilizing a neural network, identifying, in each image of the plurality of images, a plurality of body key points associated with the human body included therein. Still further, the method includes training the learning agent of the image cropping system to generate instructions for automatically cropping each image of the plurality of images in accordance with the set of image cropping configurations by, for each image of the plurality of images: (1) determining a list of tuples based on the image cropping configurations and the body key points, each tuple including a reference body key point of the plurality of body key points, a reference length and a scale; (2) aggregating the list of tuples to provide at least one border representation; and (3) generating the instructions to automatically crop the image based, at least in part, on the at least one border representation.

Still another exemplary aspect of the invention is directed to a computer system comprising: (1) means for receiving a plurality of images, each image of the plurality of images including at least a portion of a human body; (2) means for training a learning agent to determine, for each image of the plurality of images, one or more border representations derived from at least a portion of the plurality of body key points identified in the image, each border representation determined by aggregating at least two tuples, each tuple including a reference body key point, a reference length and a scale; and (3) means for deploying a cropping module to automatically crop at least a portion of the plurality of images based at least in part on the one or more border representations determined for each image. In embodiments, the computer system further comprises means for receiving a set of cropping configurations, wherein the means for determining the one or more border representations derived from at least a portion of the plurality of body key points comprises means for determining the one or more border representations derived from at least a portion of the plurality of body key points and the received cropping configurations. In embodiments, the computer system further comprises means for identifying the plurality of body key points in the portion of the human body included in each image of the plurality of images.

With reference now to the drawings, FIG. 1 is a block diagram illustrating an exemplary system 100 for cropping images using cropping configurations and body key points, in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 interacting with an image cropping system 104 to produce user-customized cropped images. Each of the components shown in FIG. 1 can be provided on one or more computing devices, such as the computing device 500 of FIG. 5, discussed below. It should be noted that implementations of the present disclosure are equally applicable to mobile computing devices and devices accepting gesture, touch and/or voice input. Any and all such variations, and any combination thereof, are contemplated to be within the scope of implementations of the present disclosure.

As shown in FIG. 1, the user device 102 and the image cropping system 104 can communicate with one another via a network 106, which may include, without limitation, one or more local area networks (LANs) and/or wide area networks (WANs). Such networking environments are commonplace in offices, enterprise-wide computer networks, intranets, and the Internet. Accordingly the network 106 is not further described herein. It should be understood that any number of user devices and image cropping systems may be employed within the system 100 within the scope of implementations of the present disclosure. Each may comprise a single device or multiple devices cooperating in a distributed environment. For instance, the image cropping system 104 could be provided by multiple devices collectively providing the functionality of the image cropping system 104 as described herein. Additionally, other components not shown also may be included within the network environment.

The image cropping system 104 generally is configured to provide cropped images utilizing user-specified cropping configurations and body key points detected in input images to user devices, such as the user device 102. Such may include providing cropped images within the context of any of a variety of different types of applications. The user device 102 can access and communicate with the image cropping system 104 via a web browser or other application running on the user device 102 via the network 106. Alternatively, in other embodiments, the image cropping system 104 or portions thereof can be provided locally on the user device 102. The image cropping system 104 includes a key point detection module 108, a learning agent 110, a receiving module 116, and a cropping module 118.

At a high level, and as more fully described below, the image cropping system 104 is configured to provide cropped images to various user devices (e.g., the user device 102) using human body key points detected by the key points detection module 108 of the image cropping system 104 and images and image cropping configurations received by the receiving module 116. For each image provided by the user device 102 (and received by the image receiving module 116), the learning agent 110 is configured to provide at least one border representation rule (all border representation rules collectively providing a cropping rule representation) using body key points detected by the key point detection module 108 and an aggregation of tuples determined (utilizing the tuple generating module 114 and the border representation generating module 112) using the cropping configurations received (by the receiving module 116) from the user device 102. The cropping module 118 is configured to use the border representation rule(s) to crop the image utilizing instructions generated by the learning agent 110. While only a single user device 102 is shown in FIG. 1, it should be understood that the image cropping system 104 may interact with any number of user devices.

The receiving module 116 is configured to receive one or more images, for instance, from the user device 102, for which a user of the user device 102 desires image cropping to be performed. The receiving module 116 further is configured to receive a set of one or more image cropping configurations to utilize in determining the position(s) at which to crop received image(s). In embodiments, the image cropping configurations are received from a user and specify the user's preferences and/or requirements for the resultant cropped images.

The key point detection module 108 is configured to detect human body key points in received image(s). In accordance with implementations of the present disclosure, human body key points may be detected by the key point detection module 108 using a neural network detection model. In embodiments, detected human body key points may comprise up to eighteen key points including the left/right eye, the left/right ear, the nose neck, the left/right shoulder, the left/right elbow, the left/right wrist, the left/right hip, the left/right knee, and the left/right ankle.

In implementations hereof, the key point detection module 108 is configured to detect human body key points using any neural network model capable of such detection. One such neural network model that can be used is Part Affinity Fields, a model that may be utilized to associate body parts with individual human bodies in an image. Part Affinity Fields uses a set of two-dimensional vector fields that encode the location and orientation of human limbs in an image. Some other models can use top-down parts detection approaches utilizing, for example, k-poselets, stacked hourglass networks, convolutional networks, deep neural networks, multi-source deep learning, convolutional part heatmap regression, etc. Other models can include bottom-up parts detection approaches that use, for example, ResNet, image-dependent pairwise scores, etc. Additionally, the key points detection module 108 may utilize any other neural network not listed above to detect human body key points within the scope of embodiments hereof. Further, one or a combination of neural network models may be used by the key point detection module 108.

The learning agent 110 is configured to generate instructions for cropping images to be provided, e.g., to the cropping module 118. The learning agent 110 includes a tuple generating module 112 and a border representation generating module 114. The learning agent 110 is configured to receive human body key points from the key point detection module 108 and cropping configurations from the receiving module 116 (the receiving module 116 having received the cropping configurations from the user device 102). The cropping configurations received may differ based on various desired characteristics of the resultant cropped image. For example, cropping configurations specifying cropped images having a rectangular shape can be defined by three configurations: 1) a crop aspect ratio, 2) an upper/lower border position or right/left border position, and 3) a body center position in X or Y axis relative to the cropped image. Any combination of these could be used. Similarly, and by way of example only, for cropping configurations specifying cropped images having a circular shape, the cropping configurations can be defined by a radius and a body center position. Cropping configurations can similarly vary based upon other specified characteristics.

By way of example, a process that may be utilized by the learning agent 110 to determine a border representation for a cropped image having a rectangular shape is shown below. Suppose a cropped image having a rectangular shape is requested with the following three cropping configurations: 1) a crop aspect ratio r, 2) an upper border position $y_u$ and a lower border position $y_l$, respectively, and 3) a body center position l in the X axis (the horizontal axis) relative to the image. These cropping configurations define some characteristics of the cropped image requested by the user. Given $y_u$, $y_l$ and r, the tuple generating module 112 is configured to receive input of a crop height and width (i.e., H and W, respectively), where H and W can be defined as:

$$H=|y_u-y_l| \text{ and } W=r*H.$$

The body center position l determines where the border representation(s) will be placed in the X (horizontal) axis. For example, if l=0.5, then the body in the image will be aligned with the horizontal position of the cropped image.

The tuple generating module 112 further is configured to determine the potential coordinates $\{x_1, y_1, x_2, x_4\}$ for cropping the received image(s). For example, for an image coordinate system with the origin at the body center (H/2, W/2), the potential coordinates for positioning a crop border representation can be defined as:

$$x_1 = -r|y_u - y_l|^1$$

$$y_1 = y_u$$

$$x_2 = r|y_u - y_l|(1-l)$$

$$y_2 = y_l$$

The tuple generating module 112 further is configured to generate a set of tuples. Each tuple is defined as $t=[p,(p,(p_1, p_2), s]$, where p is the reference body key point, $p_1$ and $p_2$ are two body key points used for defining the reference length, and s is a scale relative to the reference length to determine the vertical offset regarding the reference point p.

The border representation module 114 is configured to determine the upper and lower body positions using a set of tuples $[t_1, t_2, \ldots, t_k]$ where each tuple $t_i$ defines an anchor level in the Y (vertical) axis. Thus, the border representation module 114 is configured to determine the y coordinate $y_{t_i}$ of each of the anchor levels as:

$$y_{t_i} = y_p + s^* \text{dist}(p_1, p_2),$$

where $y_p$ is the y coordinate of the reference point p. The final upper/lower border representation may be determined by the border representation module 112 by aggregating the set of tuples. The set of tuples can be aggregated by taking the minimum, maximum or average of the y coordinates $y_{t_i}$ of each of the anchor levels. For all crop configurations, the upper/lower border crop positions can be defined as: $\{[t_1, t_2, \ldots, t_k]$, mode$\}$, where mode$\in\{$MIN, MAX, AVG$\}$ defines how to aggregate the tuples. The set of border representations generated collectively comprise a cropping rule representation determined based upon the cropping configurations and the received image.

The cropping module 114 is configured to receive cropping instructions from the learning agent 110 and to automatically crop the image(s) based on the border representations (e.g., upper and lower border representations) and the crop coordinates $\{x_1, y_1, x_2, y_2\}$. The image cropping system 104 is configured to automatically repeat the above-detailed process for each image in a set of images for which the same set of cropping configurations is to be utilized.

Figure 2:
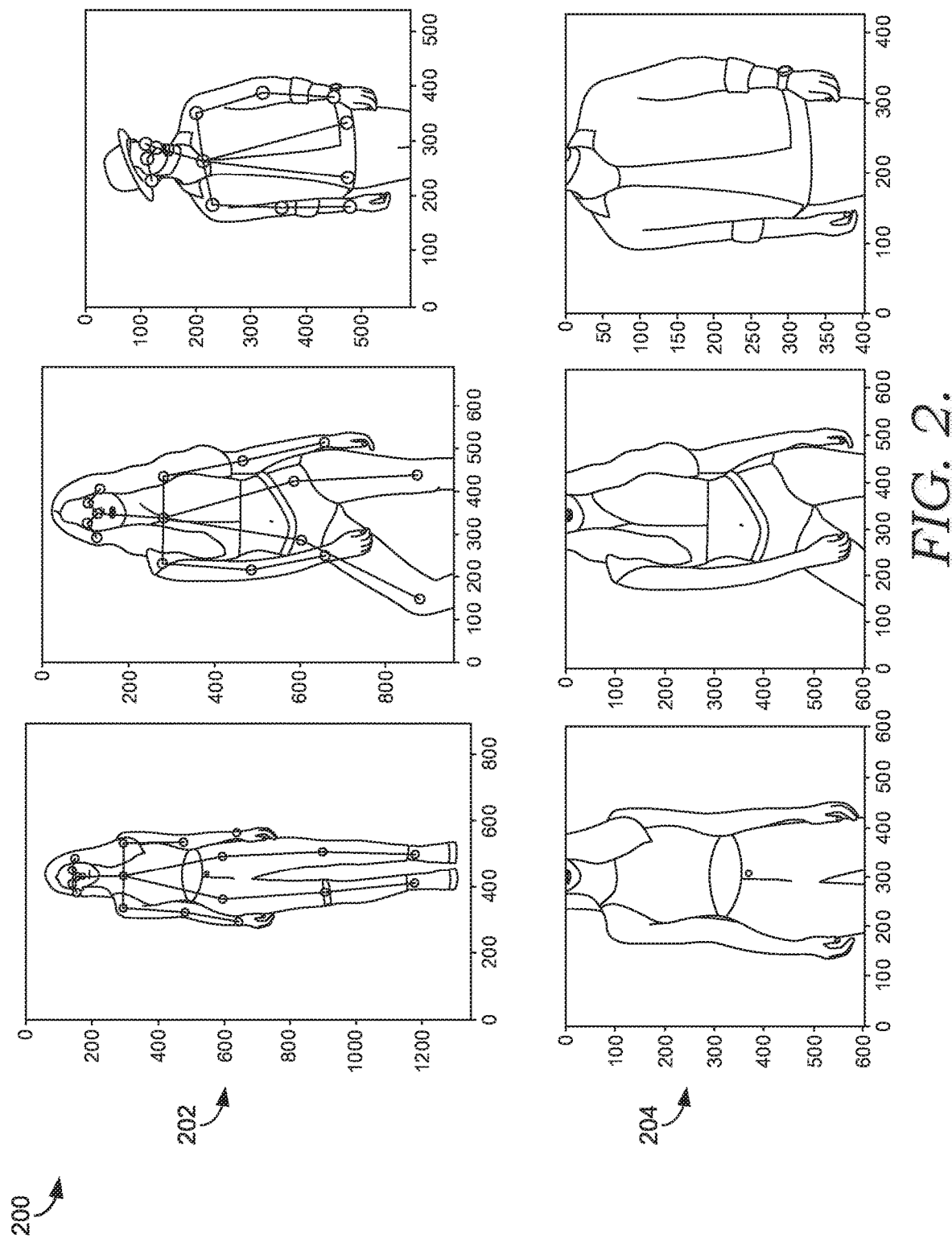
FIG. 2 is a diagram illustrating body key points detected for an image that includes a human subject, in accordance with some implementations of the present disclosure.

By the way of example only and not limitation, FIG. 2 illustrates exemplary received images 202 and cropped images 204 (the cropping being performed, for instance, by the image cropping system 104 of FIG. 1) according to a set of cropping configurations, a crop aspect ratio r=1, and a body center position l=0.5. The cropping configurations define a cropped image having a square shape with the body being aligned with the center of the cropped image. In each pair of images 202, 204 in FIG. 2, the upper border position has two anchor levels, both defined relative to the position of the nose, thus making the nose the reference point for each. The scale is defined relative to the nose and each of the left eye and the right eye (thus resulting in two anchor levels). Accordingly, the reference point p is the nose, the two body key points used for defining the reference length, $p_1$ and $p_2$, are the nose and the left eye for tuple $t_1$, and the nose and the right eye for tuple $t_2$. If the mode of anchor level aggregation selected (by way of example only) is the average of the anchor levels, the upper border position is defined as:

{[[nose,(nose,left eye)−1.0],[nose,(nose,right eye),−1.0]],mode=AVG}

Similarly, assume the lower border position has a total of four anchor levels, namely, two anchor levels below the wrists and two anchor levels above knees. If the aggregation of the four anchor levels is defined by a minimum, the lower border position is defined as:

{[[left wrist, (left elbow, left wrist), −0.7], [right wrist, (right elbow, right Wrist), −0.7], [left knee, (left knee, left hip), 0.4], [right knee, (right knee, right hip), 0.4]]], mode=MIN}.

Similarly, the same process can be used for cropping images into any of a variety of configurations including but not limited to a circular shape, a star shape, an oval shape, an octagonal shape, etc. The cropping configurations can be changed according to the shape (or other configured) requested in the cropping configurations. The learning agent 110 is configured to determine the appropriate anchor level tuples and aggregate them in a similar manner as described above when a cropped image having a shape other than a rectangle is requested.

Referring now to FIG. 3, a flow diagram is provided illustrating a method 300 for cropping an image using body key points and customized cropping configurations, in accordance with an embodiment of the present disclosure. Each block of the method 300, and any other methods described herein, comprises a computing process that may be performed using any combination of hardware, firmware, and/or software. For instance, various functions may be carried out by a processor executing instructions stored in memory. The methods also may be embodied as computer-usable instructions stored on computer storage media. The methods may be provided by a standalone application, a service or hosted service (standalone or in combination with another hosted service), or a plug-in to another product, to name a few. The method 300 may be performed, for instance, by the receiving module 116, the tuple generating module 112, the border representation module 114, and the cropping module 118 of FIG. 1.

Initially, as shown at block 302, a set cropping configurations is received. The cropping configurations can be different based on the characteristics of the resultant cropped images specified. For instance, for a cropped image having a rectangular shape, the cropping configurations may include a crop aspect ratio, two border positions and a body center position in the X or Y axis relative to the cropped image.

As shown at block 304, an image is received. In the image is included at least a portion of a human body having a plurality of body key points associated therewith. In embodiments, the human body key points can comprise between two and eighteen key points including the left/right eye, the left/right ear, the nose, the neck, the left/right shoulder, the left/right elbow, the left/right wrist, the left/right hip, the left/right knee, and the left/right ankle. The detected key points are used as reference points for determining border representations.

As shown at block 306, a learning agent of an image cropping system is deployed to (1) determine, utilizing a tuple generating module implemented by a processor, a list of tuples based on the set of image cropping configurations and at least a portion of the plurality of body key points. As previously discussed, each tuple consists of a reference body key point of the plurality of body key points, a reference length defined by a distance between two of the plurality of body key points, and a scale, the value of which is determined based on the reference length, in order to determine any offset for positioning a border representation with respect to the reference body key point. The learning agent further is deployed to aggregate, utilizing a border representation generating module implemented by the processor, the list of tuples to generate at least one border representation. As described above, the aggregation can be done as a minimum, maximum or average of all possible anchor levels.

As shown at block 308, after determining at least one border representation the image is automatically cropped, utilizing a cropping module implemented by the processor, based at least in part on the at least on border representation.

Turning now to FIG. 4, a flow diagram is provided showing a method 400 for training a learning agent of an image cropping system to crop images, in accordance with an embodiment of the present disclosure. Each block of the method 400, and any other methods described herein, comprises a computing process that may be performed using any combination of hardware, firmware, and/or software. For instance, various functions may be carried out by a processor executing instructions stored in memory. The methods also may be embodied as computer-usable instructions stored on computer storage media. The methods may be provided by a standalone application, a service or hosted service (standalone or in combination with another hosted service), or a plug-in to another product, to name a few. The method 400 may be performed, for instance, by the receiving module, 116, the tuple generating module 112, the border representation module 114, and the cropping module 118 of FIG. 1.

Initially, as shown at block 402, a set of cropping configurations is obtained by the image cropping system. The cropping configurations can be different based on the characteristics of the cropped images desired. Also received is a plurality of images, each image of the plurality including at least a portion of a human body.

Utilizing a neural network, a plurality of body key points is identified in each image of the plurality of images, as shown at block 404. As discussed earlier, there are a number of neural network models that can be used to detect human body key points. Any model capable of such detection can be used alone or in combination with another model.

As shown at block 406, the learning agent is trained to generate instructions for automatically cropping each image of the plurality of images in accordance with the set of image cropping configurations. In embodiments, such training may be accomplished by: (1) determining a list of tuples based on the image cropping configurations and the body key points, each tuple including a reference body key point of the plurality of body key points, a reference length, and a scale; (2) aggregating the list of tuples to provide at least one border representation; and (3) generating the instructions to manually crop the image based, at least in part, on the at least one border representation. Each of the training steps may be repeated until all received images are cropped.

Having described implementations of the present disclosure, an exemplary operating environment in which embodiments of the present invention may be implemented is described below in order to provide a general context for various aspects of the present disclosure. Referring to FIG. 5 in particular, an exemplary operating environment for implementing embodiments of the present invention is shown and designated generally as the computing device 500. The computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, the computing device 500 includes a bus 510 that directly or indirectly couples the following devices: a memory 512, one or more processors 514, one or more presentation components 516, one or more input/output (I/O) ports 518, one or more input/output components 520, and an illustrative power supply 522. The bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

The computing device 500 typically includes a variety of computer-readable media. Computer-readable media can be any available media that can be accessed by the computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 512 includes computer-storage media in the form of volatile and/or nonvolatile memory. The memory may be removable, non-removable, or a combination thereof. Exemplary hardware devices include solid-state memory, hard drives, optical-disc drives, etc. The computing device 500 includes one or more processors that read data from various entities such as the memory 512 or the I/O components 520. The presentation component(s) 516 present data indications to a user or other device. Exemplary presentation components include a display device, speaker, printing component, vibrating component, etc.

The I/O ports 518 allow the computing device 500 to be logically coupled to other devices including the I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion.

As described above, implementations of the present disclosure provide systems, methods and computer storage media for cropping images containing human subjects using body key points.

Some specific embodiments of the present invention have been described in relation to particular aspects, which are intended in all respects to be illustrative rather than restrictive. Alternative embodiments will become apparent to those of ordinary skill in the art to which the present invention pertains without departing from its scope.

Certain illustrated embodiments hereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 300 of FIG. 3 and 400 of FIG. 4 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer storage media storing computer-useable instructions that, when used by one or more computing devices, cause the one or more computing devices to perform operations comprising:

receiving a set of image cropping configurations;
receiving an image, the image including at least a portion of a human body having a plurality of body key points associated therewith;
deploying a learning agent of an image cropping system to:
determine, utilizing a tuple generating module implemented by a processor, a list of tuples based on the set of image cropping configurations and at least a portion of the plurality of body key points, each tuple including a reference body key point of the plurality of body key points, a reference length defined by a distance between two of the plurality of body key points, and a scale; and
aggregate, utilizing a border representation generating module implemented by the processor, the list of tuples to generate at least one border representation; and
utilizing a cropping module implemented by the processor, to automatically crop the image based at least in part on the at least one border representation.

2. The one or more computer storage media of claim 1, wherein the operations further comprise accessing a neural network detection model to identify, in the image, the plurality of body key points.

3. The one or more computer storage media of claim 1, wherein the operations further comprise deploying the learning agent of the image cropping system to generate instructions to automatically crop the image based at least in part on the at least one border representation.

4. The one or more computer storage media of claim 1, wherein the operations further comprise a plurality of human-body-containing images and deploying the learning agent to automatically crop each of the plurality of images in accordance with the set of image cropping configurations.

5. The one or more computer storage media of claim 1, wherein the plurality of body key points comprises eighteen body key points, and wherein each body key point of the plurality of body key points is capable of being utilized as the reference body key point.

6. The one or more storage media of claim 5, wherein detecting the plurality of body key points associated with the human body included in the image comprises detecting at least a portion of the plurality of body key points using Part Affinity Fields.

7. The one or more computer storage media of claim 1, wherein the cropping configurations define a rectangular cropped image, and wherein the cropping configurations include, at least, a crop aspect ratio, an upper body position, a lower body position, and a body center position.

8. The one or more computer storage media of claim 1, wherein the cropping configurations define a circular cropped image, and wherein the cropping configurations include, at least, a radius and a body center position.

9. A computer-implemented method of training a learning agent of an image cropping system to crop images, the method comprising:

obtaining, by the image cropping system, a set of image cropping configurations and a plurality of images, each image of the plurality of images including at least a portion of a human body;
utilizing a neural network, identifying, in each image of the plurality of images, a plurality of body key points associated with the human body included therein; and
training the learning agent of the image cropping system to generate instructions for automatically cropping each image of the plurality of images in accordance with the set of image cropping configurations by, for each image of the plurality of images:

determining a list of tuples based on the image cropping configurations and the body key points, each tuple including a reference body key point of the plurality of body key points, a reference length and a scale;

aggregating the list of tuples to provide at least one border representation; and generating the instructions to automatically crop the image based, at least in part, on the at least one border representation.

10. The method of claim 9, further comprising, utilizing a cropping module implemented by the processor, automatically cropping each image based at least in part on the generated instructions.

11. The method of claim 9, wherein the plurality of body key points comprises eighteen body key points, and wherein each body key point of the plurality of body key points is capable of being utilized as the reference body key point.

12. The method of claim 9, wherein detecting the plurality of body key points associated with the human body comprises detecting at least a portion of the plurality of body key points using Part Affinity Fields.

13. The method of claim 9, wherein the set of cropping configurations defines a rectangular cropped image, and wherein the cropping configurations include, at least, a crop aspect ratio, an upper body position, a lower body position, and a body center position.

14. The method of claim 9, wherein the plurality of body key points comprises eighteen body key points, and wherein each body key point of the plurality of body key points is capable of being utilized as the reference body key point.

15. The method of claim 9, wherein the set of cropping configurations defines a circular cropped image, and wherein the cropping configurations include, at least, a radius and a body center position.

16. A computer system comprising:

means for receiving a plurality of images, each image of the plurality of images including at least a portion of a human body;

means for training a learning agent to determine, for each image of the plurality of images, one or more border representations derived from at least a portion of a plurality of body key points identified in the image, each border representation determined by aggregating at least two tuples, each tuple including a reference body key point, a reference length and a scale; and means for deploying a cropping module to automatically crop at least a portion of the plurality of images based at least in part on the one or more border representations determined for each image.

17. The system of claim 16, further comprising means for receiving a set of cropping configurations, wherein the means for determining the one or more border representations derived from at least a portion of the plurality of body key points comprises means for determining the one or more border representations derived from at least a portion of the plurality of body key points and the received cropping configurations.

18. The system of claim 16, further comprising means for identifying the plurality of body key points in the portion of the human body included in each image of the plurality of images.

19. The system of claim 18, wherein the means for identifying the plurality of body key points comprises means for accessing a neural network detection model to identify the plurality of body key points.

20. The system of claim 19, wherein the means for identifying the plurality of body key points comprises means for using Part Affinity Fields for identifying the plurality of body key points.

* * * * *